United States Patent
Yalovsky et al.

(10) Patent No.: US 7,539,940 B2
(45) Date of Patent: May 26, 2009

(54) SYSTEM AND METHOD FOR CONVERTING BETWEEN TEXT FORMATTING OR MARKUP LANGUAGE FORMATTING AND OUTLINE STRUCTURE (75) Inventors: Mark Yalovsky, Seattle, WA (US); Peter P. Baer, Duvall, WA (US); Yevgeniya Sigal, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 10/268,150

(22) Filed: Oct. 9, 2002

(65) Prior Publication Data
US 2004/0070607 A1 Apr. 15, 2004

(51) Int. Cl.
G06F 17/00 (2006.01)
G06F 17/20 (2006.01)

(52) U.S. Cl. .............. 715/270; 715/204; 715/234; 715/243; 715/255; 715/256

(58) Field of Classification Search .............. 715/746, 715/769, 500, 505, 513, 516, 517, 526, 1, 715/204, 234, 243, 255, 256, 270, 506, 514; 707/102, 513
See application file for complete search history.

(56) References Cited

U.S. PATENT DOCUMENTS

| | | | | |
|---|---|---|---|---|
| 4,495,490 A | | 1/1985 | Hopper et al. | 340/709 |
| 5,111,398 A | * | 5/1992 | Nunberg et al. | 704/9 |
| 5,276,793 A | * | 1/1994 | Borgendale et al. | 715/513 |
| 5,446,896 A | | 8/1995 | Hegarty et al. | 395/650 |
| 5,530,794 A | | 6/1996 | Luebbert | 395/148 |
| 5,734,905 A | | 3/1998 | Oppenheim | 395/683 |
| 5,920,877 A | * | 7/1999 | Kolster | 715/512 |
| 6,038,573 A | * | 3/2000 | Parks | 715/513 |
| 6,490,603 B1 | * | 12/2002 | Keenan et al. | 715/513 |
| 6,691,281 B1 | * | 2/2004 | Sorge et al. | 715/503 |
| 6,741,268 B1 | * | 5/2004 | Hayakawa | 715/777 |
| 2001/0014899 A1 | * | 8/2001 | Fujikawa | 707/513 |
| 2001/0044798 A1 | * | 11/2001 | Nagral et al. | 707/102 |
| 2002/0010700 A1 | * | 1/2002 | Wotring et al. | 707/100 |
| 2002/0010715 A1 | * | 1/2002 | Chinn et al. | 707/514 |
| 2002/0038319 A1 | * | 3/2002 | Yahagi | 707/513 |
| 2002/0078343 A1 | * | 6/2002 | Rubin et al. | 713/153 |
| 2002/0184269 A1 | * | 12/2002 | Imagou | 707/523 |
| 2003/0007397 A1 | * | 1/2003 | Kobayashi et al. | 365/200 |

(Continued)

OTHER PUBLICATIONS

IBM- TDB, Generalized Markup Integrates Automatically Reports with a Text Processing System, vol. No. 22, Issue No. 11, pp. 5129-5133, Publication Date Apr. 1, 1980.*

(Continued)

*Primary Examiner*—Tadeese Hailu
(74) *Attorney, Agent, or Firm*—Merchant & Gould PC (57) ABSTRACT

Described is a mechanism for importing data into an outline aware application if the data does not include outline structure, and for creating outline structure in the data based on indicia of visual structure that may be present in the data. In one aspect, data is selected for import into the outline application. The data is devoid of outline structure, such as relative level information or parent/child relationship information. However, the data includes indicia of visual structure, such as markup attributes or tab characters. The outline application (or some related component) transforms the selected data into outline structured data based on the indicia of visual structure.

23 Claims, 7 Drawing Sheets

U.S. PATENT DOCUMENTS

2003/0177449 A1* 9/2003 Rose .................... 715/530
2003/0229607 A1* 12/2003 Zellweger et al. .............. 707/1
2004/0139400 A1* 7/2004 Allam et al. ................ 715/526

OTHER PUBLICATIONS

Helene Richy; "A Hypertext Electronic Index based on the Structured Document Editor Grif"; Electronic Publishing, vol. 7('), Mar. 1, 1994; pp. 1-14.

Kees van der Laan; "Working Group 1: Education: Review Michael Urban's *An Introduction to LATEX*"; Feb. 1992; pp. 23-34.

Boze; "Software Reviews"; 2006; Information Technology and Libraries; ITAL vol. 20, No. 1; 12 pgs.

Anonymous; "Convert Text Files to HTML or RTF Tables"; http://web.archive.org/web/20001206032800/www.jafsoft.com/asctptab/index.html; 4 pgs., Dec. 6, 2000.

Slocombe et al.; "There Are No Unstructured Documents"; XML Europe 2002; pp. 1-7.

Anonymous; "VersaPro Programming Software—User's Guide"; Nov. 2000; 5 pgs.

Burton; "Re: Writing Mathematica Data to a Tab Delimited File"; Jun. 1999; 3 pgs.

* cited by examiner

301 {
  <L1>This is one line
      <L2>This is slightly indented
          <L3>More indented</L3>
      </L2>
  </L1>

303 {
  <L1>This is another line
      <L3>This is twice indented
          <L4>Thrice indented</L4>
      </L3>
  <L1>

305 {
  <L1>This is yet another line
      <L2>This is once indented</L2>
      <L2>This is also once indented</L2>
  307 {
      <L2>This is also once indented
          <L3>This is twice indented</L3>
          <L3>This is also twice indented</L3>
      </L2>
  }
  </L1>
}

SYSTEM AND METHOD FOR CONVERTING BETWEEN TEXT FORMATTING OR MARKUP LANGUAGE FORMATTING AND OUTLINE STRUCTURE

BACKGROUND OF THE INVENTION

Computing systems have achieved widespread acceptance as a means for creating and manipulating a wide variety of types of documents. For instance, users routinely create word processing documents, drawing documents, spreadsheet documents, database documents, and the like. Even among word processing documents there may be various types. For instance, some word processing applications may be designed to provide rich formatting and page layout functionality, such as a desktop publishing application. Other word processing applications may be designed as simple text editors. Still other word processors may be designed as tools for organizing textual data or notes into useful information.

One of the problems facing many software designers is the consumer's desire to share information between various of these types of applications. In many cases, sharing the information is a relatively simple matter. For instance, copying data from one application into another application that shares similar functionality does not require extensive transformation of the data to support the transaction. However, in other circumstances, sharing data between one application and another application that has fundamentally different features poses a problem for the designers. For instance, data from a word processing application cannot easily be copied and pasted into a database application because a database application maintains its data in a fundamentally different way than a word processing application. In many of these situations, it may be relatively easy to simply share data, but very difficult to share the data in a meaningful way. However, striving for data compatibility between a source application and a target application continues to be a goal of most software designers.

SUMMARY OF THE INVENTION

The present invention is directed at a mechanism for importing data into an outline aware application if the data does not include outline structure, and for creating outline structure in the data based on indicia of visual structure that may be present in the data. In one aspect, data is selected for import into the outline application. The data is devoid of outline structure, such as relative level information or parent/child relationship information. However, the data includes indicia of visual structure, such as markup attributes or tab characters. The outline application (or some related component) transforms the selected data into outline structured data based on the indicia of visual structure. In one example, levels in the outline structure may be based on a number of tab characters associated with a portion (e.g., a paragraph) of the selected data. In another example, levels in the outline structure may be based on an aggregate indentation described in markup associated with a portion (e.g., a tag or element) of the data.

DETAILED DESCRIPTION OF THE PREFERRED EMBODIMENT

The invention provides a mechanism for manipulating data between a first format and a second format where the first format does not include outline structure and the second format does. The mechanism transforms data from non-outline format to outline format based on indicia included in the data that suggests what the outline structure should be. For example, if the data includes "tab" formatting to provide visual structure, the mechanism may create outline structure by interpreting the tab formatting. If the data includes markup formatting, the mechanism may create outline structure by interpreting information within the markup formatting. Conversely, the mechanism may transform outline-structured data into textual data by converting the outline structure into tab formatting.

Figure 1:
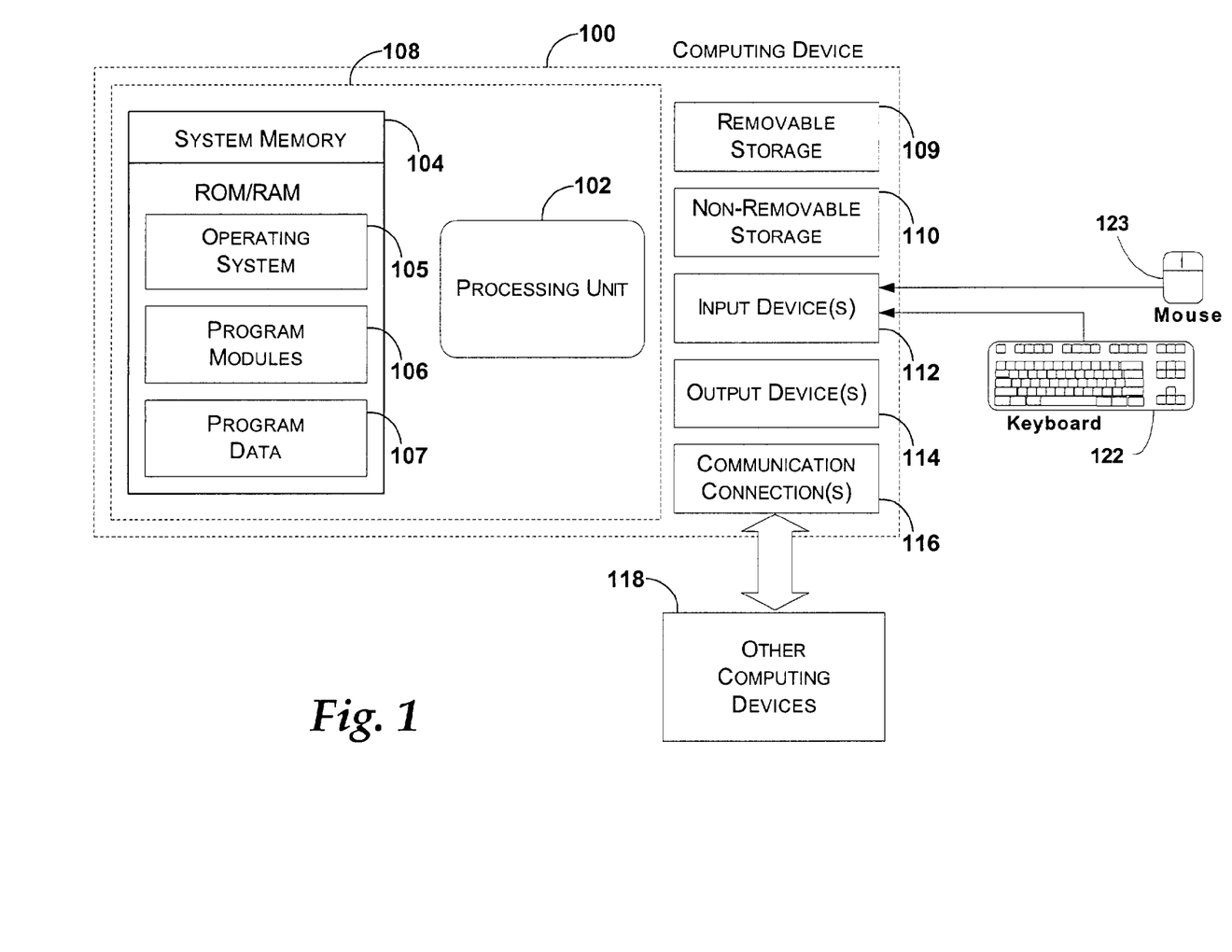
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s)

112 such as keyboard 122, mouse 123, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
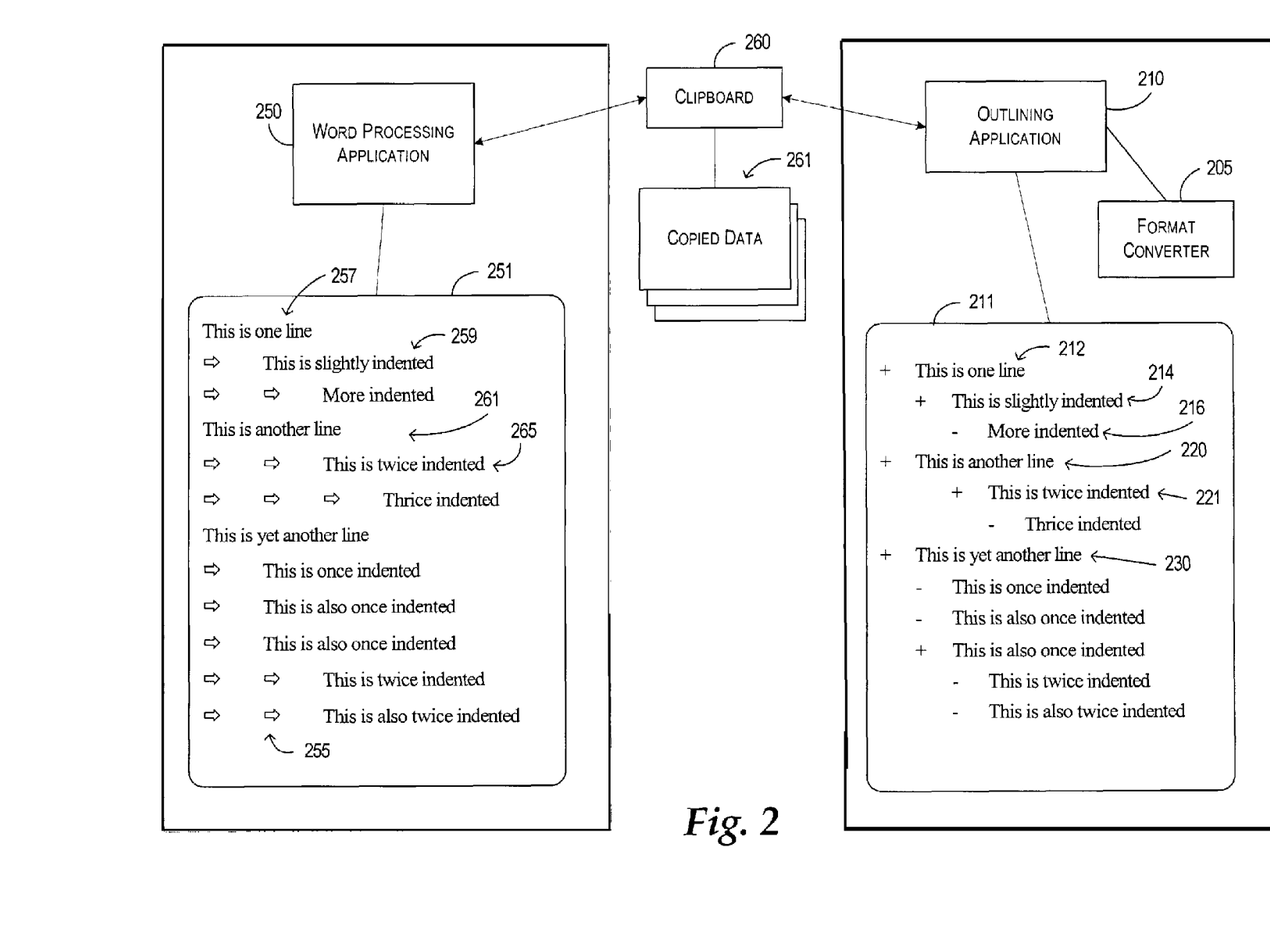
FIG. 2 is a functional block diagram generally illustrating components of a system implementing the present invention.

FIG. 2 is a functional block diagram generally illustrating components of a system implementing the present invention. In the system, there are two applications, an outlining application 210 and a non-outlining application 250. The non-outlining application 250 may be any software application capable of creating, editing, or manipulating electronic data such as text. Examples of the non-outlining application 250 may be a word processor, a spreadsheet application, a database application, or the like. The non-outlining application 250 may also include web-browsing software of the type used for viewing markup-based (e.g., HyperText Markup Language or eXtensible Markup Language) pages or the like. The non-outlining application 250 includes the capability to insert characters or data into the text that delineates one portion of the data from another portion of the data. For example, a tab character may be inserted at the beginning of a line of text to provide a visual distinction between that line of text and another line of text. For simplicity of discussion only, portions of data will be uniformly described here as text although the present invention is not so limited.

Using the non-outlining application 250, users can create documents, such as a text document 251, including, in this example, many lines of text. In this example, the text document 251 includes separate lines of text that have been given visual structure (as distinguished from outline structure described later) through the use of tab characters, such as tab character 255. Although visible in FIG. 2, it is commonly understood that the icon used to illustrate the existence of a tab character (a hollow arrow in this example) may be hidden and typically does not appear in a printed version of the text document 251.

Tab characters are commonly used to indent a line of text from one edge of the page. To provide a visual distinction between lines of text (or paragraphs), a different number of tab characters may be used, resulting in a visual distinction between the lines. For instance, a first line 257 does not include a tab character, and hence the text begins at the leftmost portion (commonly called the left margin) of the text document 251. However, a second line 259 includes a tab character, thus causing the second line 259 to begin at some defined position indented from the leftmost portion of the text document 251. In this way, a visual distinction exists between the first line 257 and the second line 259. Additional tab characters further indent lines of text and may be used to provide additional visual distinctions between lines. It should be noted that although described here as being indented from the left margin, it will be appreciated that some languages are right-to-left languages and that the text may be indented from the right margin.

The selective use of tab characters also enables visual grouping of lines of text. For example, the absence of tab characters on the first line 257 and the fourth line 261 makes the two lines appear to have the same level of dignity. However, the second line 259 is indented and thus appears to be related to the first line 257. Similarly, the fifth line 265 is indented and thus appears to be related to the fourth line 261 but not the first line 257. Although this technique is useful to create documents with visual structure, that structure is only an illusion. In other words, the apparent relationships between lines only exists while viewing the document as created. The lines may not be easily manipulated as a unit, and the non-outlining application 250 does not provides a way to easily alter the document or the individual lines based on those apparent relationships.

Another way in which such visual structure may be represented is through the use of markup language. For example, HyperText Markup Language (HTML) tags may be created in a document that describe text or other content of the HTML document. Those tags may include a style property that defines where the text begins in relation to the edge of the document. For example, the margin, indentation, and tab count of an HTML tag can be set using a style property. For example, the following paragraph tag:

<p style='text-indent:.5in'>Tag Content</p> creates a new paragraph with the text "Tag Content" indented 0.5 inches from the left margin of an HTML document. In another example, the following paragraph tag:

<p style='margin-left:.5in;text-indent:.5in'>Tag content</p> creates another paragraph while setting the left margin 0.5 inches from the left edge of the document, and then indents the text of the paragraph by another 0.5 inches.

It should be noted that "text-indent" and "margin-left" are Cascade Style Sheet (CSS) properties. Other similar tags and style properties, such as a tab count property, may also be used to define the visual structure of the tag content. Each of those settings may affect the visual structure of the HTML document in much the same way as tab characters in a textual document. However, as with the use of tab characters described above, using the style properties to create visual structure only affects the appearance of the document as a whole, and relationships between the elements of the document are not created.

The outlining application 210 may be any software application that includes the ability to create, edit, or manipulate data, such as text, and to add outline structure to that data. The outline structure describes relationships between portions of the data, such as different paragraphs or lines of text. Typically, the data is described in a hierarchical manner. Again, text will be used here as one illustration of such data, but the invention is not so limited. In many cases, each portion of text is assigned a level within the outline structure, and many portions of text are assigned a parent. Thus, a passage of text may exist at a first level. That passage of text may have one or more children at a second or lower level. Those children may then have their own children at a next lower (e.g., third) level. For the purpose of this discussion, the outline structure relates to the creation of a hierarchy of parent/child relationships between elements of a document such that a particular element may exist in a family of related elements and at any of a plurality of levels.

The outlining application 210 maintains documents, such as outline document 211, that include data (e.g., text)

arranged in outline structure. For instance, a first element 212 includes the text "This is one line" at a first or highest level. Other elements may also exist at the first or highest level, such as a second element 220 and a third element 230. In addition, an element of the outline document 211 may have children. For instance, in the representative outline document 211, a first sub element 214 is a child of the first element 212. The first sub element 214 is at a second level. Similarly, a second sub element 216 is a child of the first sub element 214 and is at a third level. The outlining application 210 maintains information that describes each of the several relationships between each element of the outline document 211. Certain of the advantages of the outline structure over the visual structure are described later in conjunction with FIGS. 3-5.

It should also now be noted that the reference to the non-outlining application does not necessarily preclude outlining functionality. Indeed it is understood that the non-outlining application 250 may include outlining functionality and, conversely, the outlining application 210 may be used without adding outline structure to the data within the outline document 211. Similarly, the non-outlining application 250 may be capable of creating parent/child relationships with no visual distinction. However, for the purpose of illustrating this implementation of the invention, any outlining functionality that the non-outlining application 250 may have is not being used to create outline structure within the text document 251, or more specifically, outline structure within data that may be shared between the non-outlining application 250 and the outlining application 210.

A clipboard component 260 is a software component that enables information to be shared between two or more applications executing on a computing system. For instance, all or a portion of the information within the text document 251 may be "copied" or "cut" from the text document 251 by the non-outlining application 250. This operation causes a replica of that portion of the information to be passed to the clipboard component 260 by the non-outlining application. The clipboard component 260 then makes that information available for insertion (or "pasting") into any other application on the computing system.

The clipboard component 260 may make the information available in one or more different formats of copied data 261. For example, if the information is copied from a Web browser, the clipboard component 260 may make the information available in both markup format or plain text format. In that way, when pasted into another application, the copied data can maintain whatever formatting has been applied to it, or that formatting can be cast off when the data is pasted.

Figure 3:
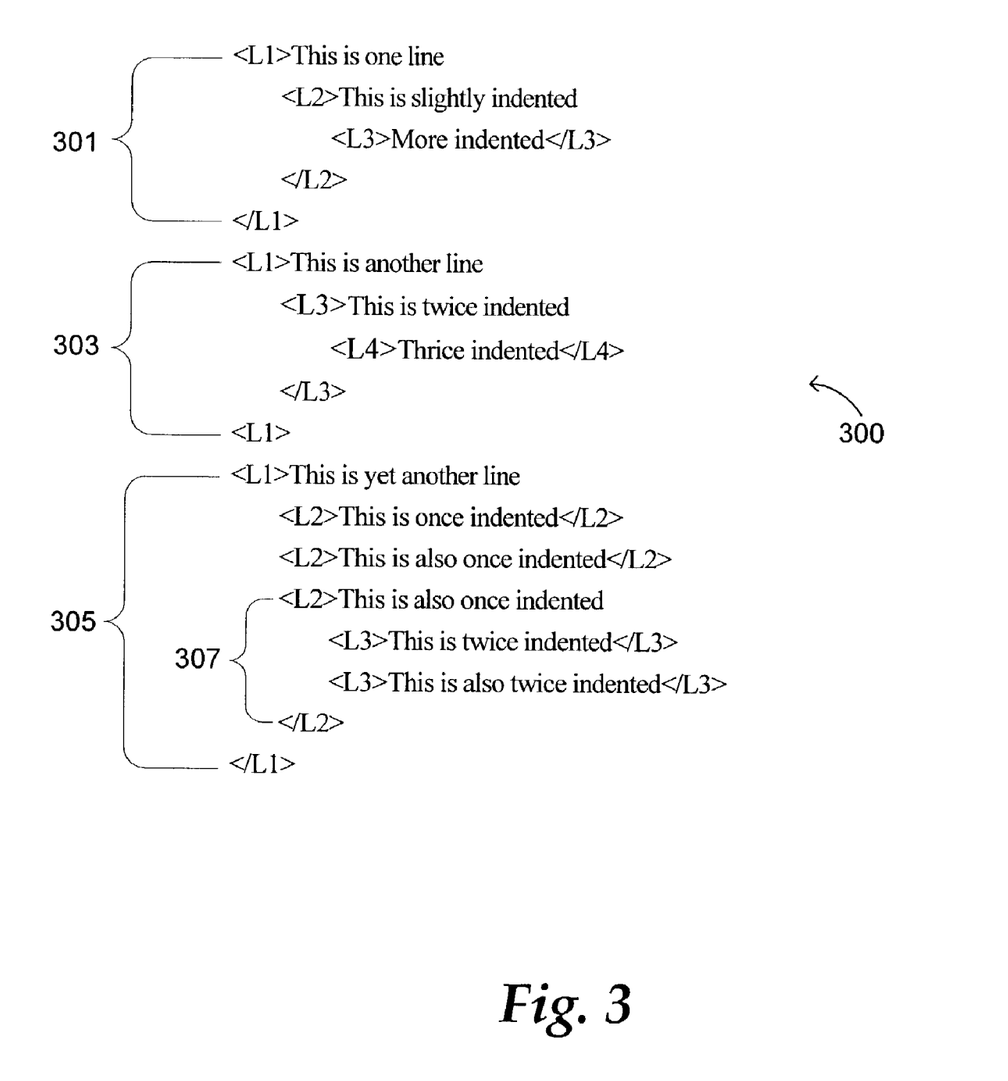
FIG. 3 is a graphical representation of the outline structure of the content of a sample outline document, in accordance with one implementation of the invention.

The format converter 205 is a component that interacts with the outlining application 210 to transform information that is received by the outlining application 210 into outline structure when pasted into the outline document 211. The format converter 205 is configured to transform information provided to the outline application 210, such as by the clipboard component 260, from another application. One graphical representation of the results of such a conversion is illustrated in FIG. 3 and described later. The format converter 205 is also configured to transform data created by the outlining application 210 from outline structure into another format, such as textual. In accordance with the invention, the format converter 205 converts information from one format to another based on rules that anticipate what outline structure might have been desired based on the visual structure that exists, and vice versa. Certain of these rules are described here.

In one implementation, the format converter 205 converts textually-formatted data as follows: When text data is received, the format converter 205 evaluates the received text data to identify any tab characters. If a tab character does not exist at the beginning of a line of text, that line of text is converted into a node level in the outline structure. The node level is the highest level of the outline structure. If a tab character does exist at the beginning of a line, then that line of text is assigned a level in the outline structure in proportion to the number of tab characters at the beginning of the line. Thus, if a single tab character exists at the beginning of a line, then that line is assigned to the second level in the outline structure. In addition, that line is identified as a child element of the immediately-preceding line of text of greater level.

Thus, referring to the text document 251 of FIG. 2, the first line 257 does not begin with a tab character, and so the format converter 205 is configured to convert the first line 257 to a node element (first-level element) in the outline document 211 (i.e., the first element 212). The second line 259 of the text document 251 begins with a single tab character, so it is converted to the second-level element sub element 214. The immediately-preceding element of greater level than the sub element 214 is the first element 212 and so the sub element 214 is created as a child of the first element 212.

Note that the progression need not be one level at a time. For example, if the format converter 205 encounters the fifth line 265 of the text document 251 it finds two leading tab characters. Thus, the fifth line 265 is converted to a third-level element 221 in the outline document 211 even though the immediately-preceding element of greater level is a first-level element (i.e., the second element 220). Thus, the immediate parent of the third-level element 221 is two levels greater in the hierarchy.

If a tab character exists at some point other than at the beginning of a line of text, a nested heading may be created with the content to the left of the tab character as the parent node and the content to the right of the tab character as the child node. A nested heading (also called a Cornell outline) is a horizontally laid out outline structure. Take the following outline structure:

| | | |
|---|---|---|
| One | | |
| | Two | |
| | | Three A |
| | | Three B |

Laid out as a nested heading, it looks like:

| | | |
|---|---|---|
| One | Two | Three A |
| | | Three B |

If a paragraph immediately after a paragraph that has been converted to a nested heading contains one or more tabs at the beginning of its line, then it will be inserted as a child of the pervious nested heading with its level set in proportion to the number of tabs at the beginning of the paragraph. However, if no tab exists at the beginning of the line, then it is pasted as an indented heading.

In the case that the copied data 261 pasted into the outline application 210 is markup based, the following rules may be applied to convert style-defined data into outline structure: To begin, the format converter 205 may sum each of the properties of a tag that affect the indentation of the tag content. Examples of such properties in HTML may be the margin properties, the indentation properties, and the tab count properties. The tab count may be converted to an appropriate unit, such as pixels, inches, or the like. In the disclosed embodiment, a 0.5 inch value is assigned to each tab count. That summation results in a total amount of indentation for each tag. Those amounts could be rounded down to some normal value, such as the nearest 0.5 inches. Then, starting from a lowest value, a relative level is assigned to each node in the data being pasted. The level increases for each portion of data that is greater than some increment of indentation from the previous level. For example, the level may be incremented by one for every 0.5 inches of indentation. Thus, a difference of 1.0 inches between two nodes results in a difference of two levels.

The format converter 205 is also configured to convert data from the outline structure to textual format. For instance, if a selection of data from the outline document 211 is copied and pasted to the text document 251, the format converter 205 may be configured to transform each level into a tab character. Thus, a first-level element in the outline document 211 may not receive any tab characters, a second-level element may have a single tab character inserted at the beginning of its line, a third-level element may have two tab characters inserted at the beginning of its line, and so on. In this way, if content from the outlining application 210 is copied and pasted into a non-outlining application without the outline structure, at least the resulting data will have some visual structure that simulates the original outline structure even if no visual distinction existed in the outlining application.

FIG. 3 is a graphical representation 300 of the outline structure of the content of the outline document 211. The graphical representation 300 includes pseudo-markup language to illustrate the relationships between individual elements of the data. Each element is enclosed by a pseudo-tag that begins with a "<L#>" and ends with a "</L#>" where the "#" symbol indicates the relative level of that element.

Referring now to both FIG. 2 and FIG. 3, the first element 212 of the outline document 211 is enclosed in a first level tag 301. The second element 220 is also enclosed in another first level tag 303. Likewise, the third element 230 is also enclosed in yet another first level tag 305. Each of these elements has been identified at the first level because they came from the text document 251 without any leading tab characters or other indentation indicia.

Also apparent from the graphical representation 300 is the relative relationships of each element to the entire tree. For example, the sub element 307 is clearly identified as belonging to the second level, as indicated by the <L2> tag, but is also identified as a child element of the third element 305 by being nested entirely within the <L1> tag of the third element 305. These parent/child relationships are unascertainable in a definitive fashion from visual structure alone. This meta information about the content of the outline document 211 provides the user with rich functionality that is not available with only visual structure. For instance, the encapsulation of children with their parents allows each family of elements to be easily manipulated as a unit. Likewise, as will be made clearer in conjunction with FIGS. 4 and 5, the level assignments enables a user to very easily adjust the view of the outline document 211 to reflect more or less information to the user's liking.

Figure 4:
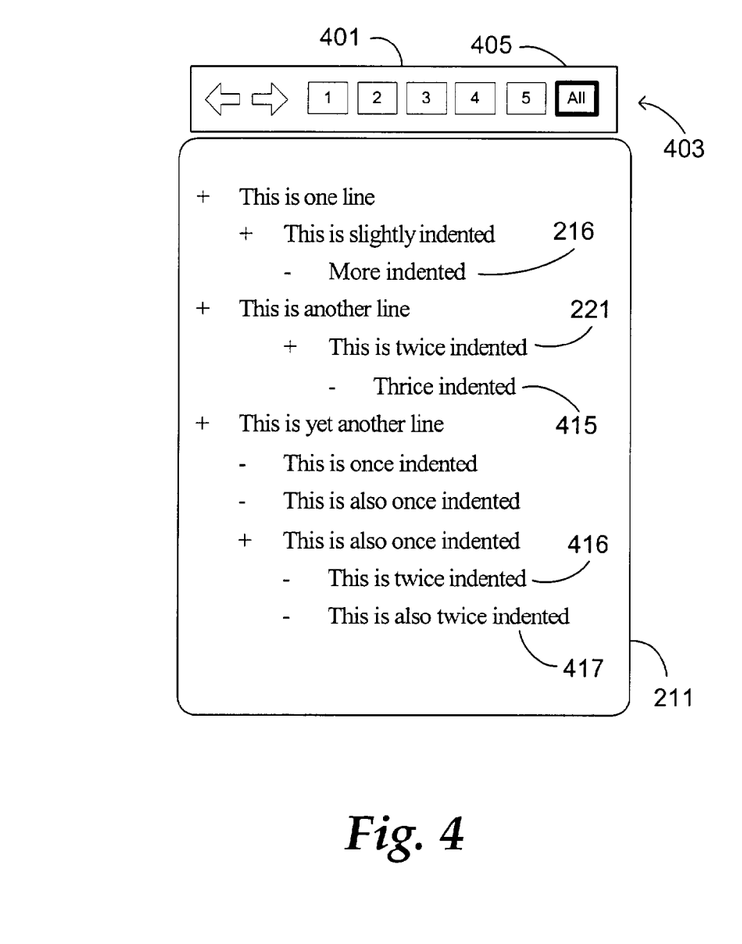
FIG. 4 is a graphical representation of an outline document having outline structure with every level expanded.
Figure 5:
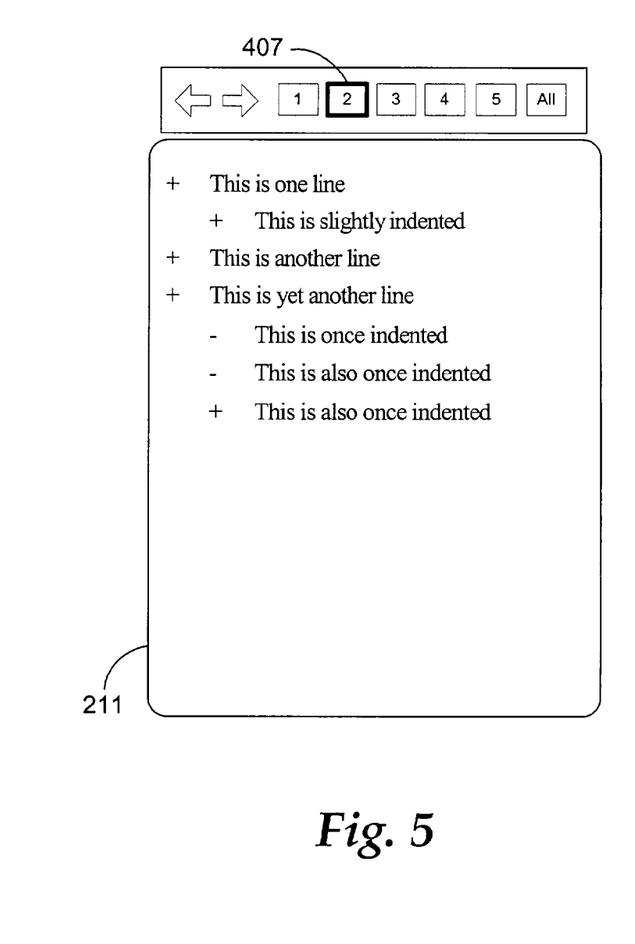
FIG. 5 is a graphical representation of the outline document of FIG. 4 with only levels two and greater expanded.

FIGS. 4 and 5 together illustrate one of the many advantages of outline structure and its distinction from simple visual structure. Illustrated in both FIGUREs is the outline document 211 from FIG. 2. In addition, a toolbar 401 is included that provides the user of the outline application 210 with options about how much of the content to display. More specifically, the toolbar 401 includes a series of buttons 403 corresponding to several levels that may be displayed in the outline document 211. Separate buttons are illustrated for each of levels 1 to 5, and an "all" button 405 identifies all of the levels. As shown in FIG. 4, the all button 405 is highlighted (shown in bold line style) to indicate its selection. Selecting the all button 405 causes all of the levels of the outline document 211 to be displayed. In contrast, as shown in FIG. 5, a "2" button 407 has been selected, indicating that the user desires to view only those elements of level 2 or higher (numerically lesser). Because each element in the outline document 211 has been assigned a particular level, multiple elements may be acted on in tandem regardless of the particular elements' parents. Thus, as shown in FIG. 5, selecting the 2 button 407 causes the elements lower than level 2 (numerically higher) to be hidden. For instance, the second sub element 216 (FIG. 4) resides at level 3 and is hidden in the view of FIG. 4. Likewise, other elements below level 3 are all hidden when the 2 button 407 is selected (e.g., elements 221, 415, 416, and 417). This ability to manipulate multiple elements of the outline document 211 that share a relative level in the outline hierarchy does not exist with only visual structure.

Figure 6:
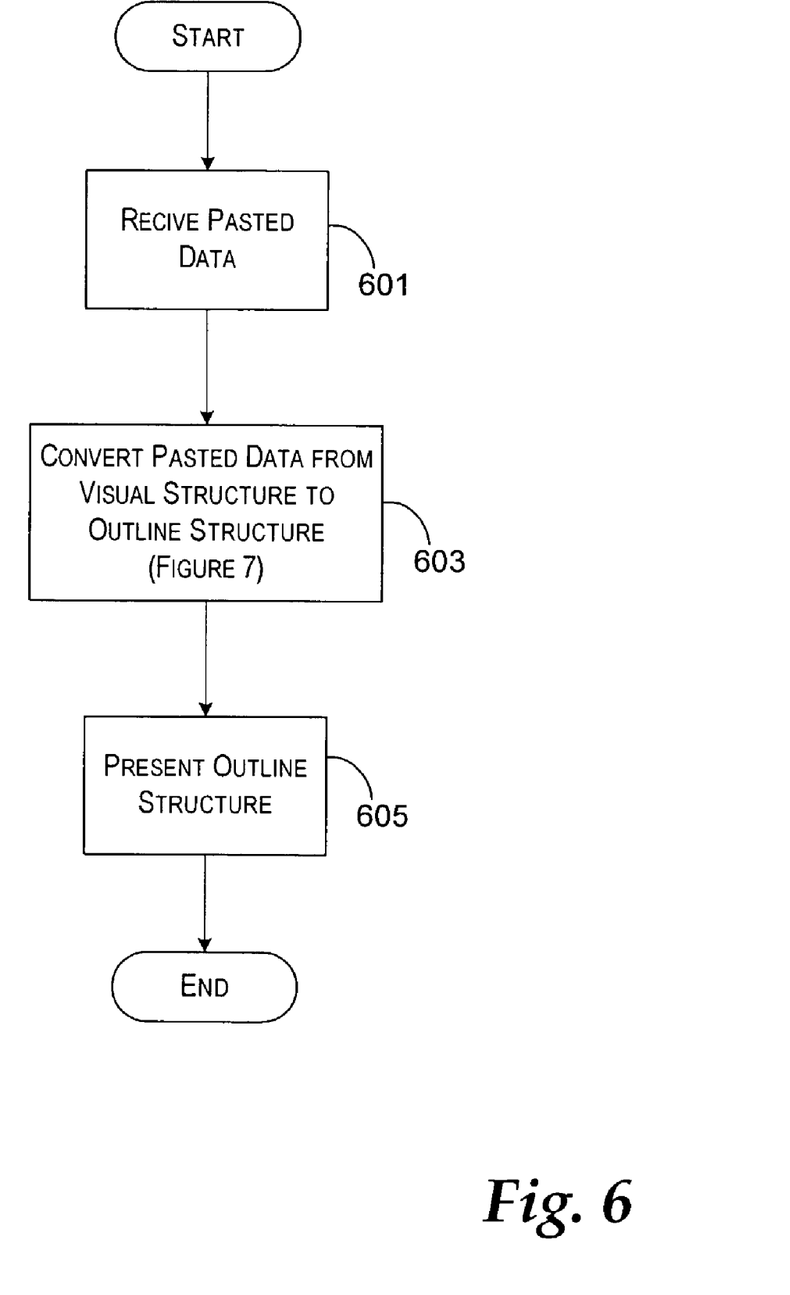
FIG. 6 is a logical flow diagram generally illustrating a process for converting data from non-outline format to outline format, such as may occur when pasting data from a non-outlining application into an outlining application.

FIG. 6 is a logical flow diagram generally illustrating a process for converting data from non-outline format to outline format, such as may occur when pasting data from a non-outlining application into an outlining application. The process enters at block 601, where data is pasted into an outline-aware application, such as the outlining application 210 described above. The data may be pasted from a clipboard or similar component and originate with an application that did not include outline structure information in the data. However, the data may include indicia of visual structure, such as tab characters or markup language tags that define the visual structure of the data. Once the data is received at the outline aware application, the process continues at block 603.

At block 603, the data received at block 601 is converted from visual structure to outline structure. If the data was created by a non-outlining application, the data may be evaluated to discern indicia of visual structure and create new outline structure based on those visual structure indicia. In this way, data created without outline structure, such as by a non-outlining application, may be shared with an outlining application without losing any visual structure applied and while gaining the functionality typically associated with outlining structure. A more detailed process for performing the conversion is illustrated in FIG. 7 and described below.

At block 605, the data converted to outline structure is presented to a user. The enhanced functionality associated with outline structure is now available to the user with respect to the received data. For instance, the converted data may now be manipulated as levels and groups of data, a capability that was previously unavailable for the data.

Figure 7:
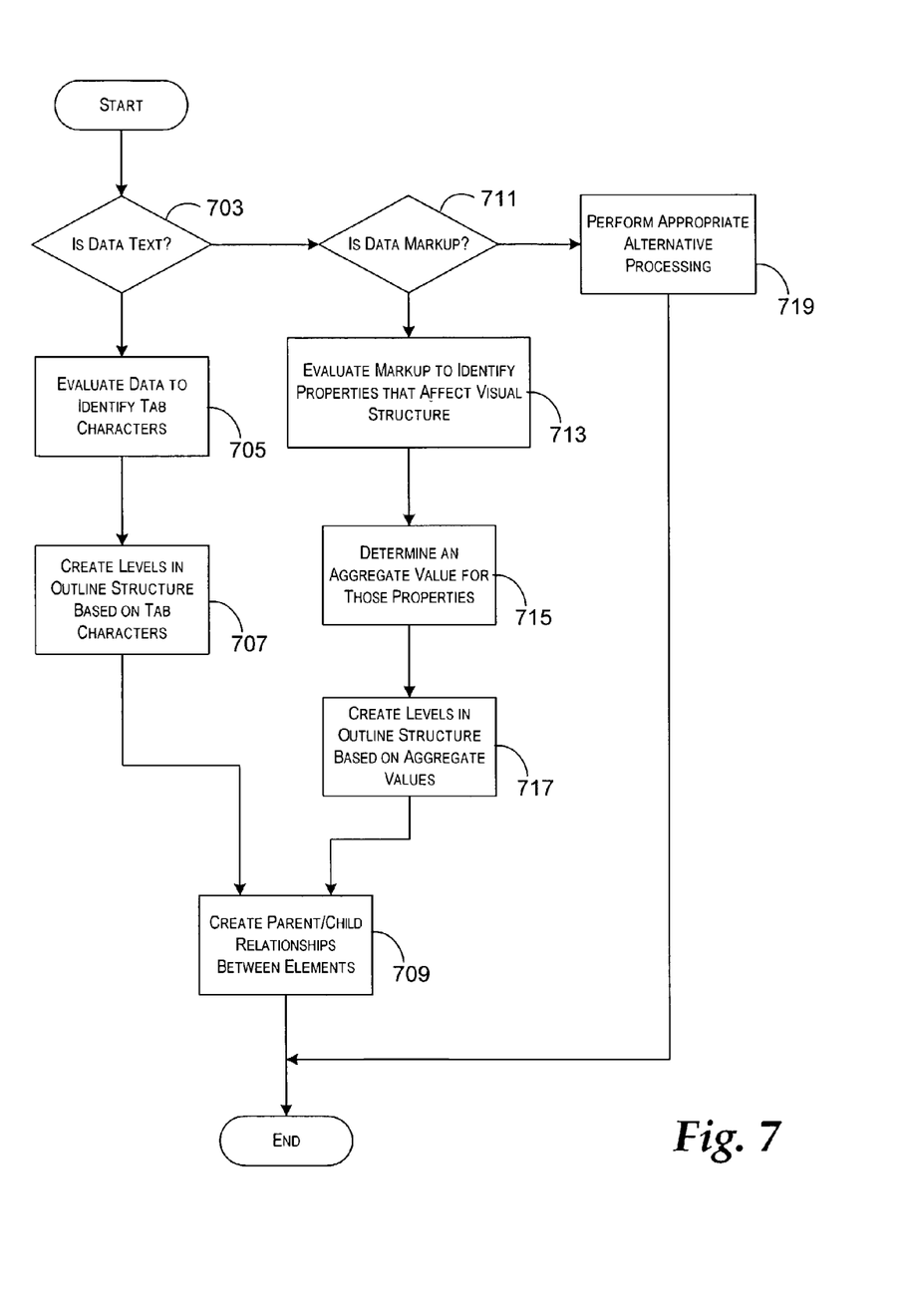
FIG. 7 is a logical flow diagram illustrating in greater detail a process for converting data from non-outline format to outline format, in accordance with one implementation of the invention.

FIG. 7 is a logical flow diagram illustrating in greater detail a process for converting data from non-outline format to outline format, in accordance with one implementation of the invention. The process enters at starting block 701, where data has been received from another application, such as through a clipboard component or the like. The process begins at decision block 703.

At decision block 703, a determination is made whether the received data is textual data, such as textual data created and maintained by a word processing application or the like. If not, processing continues at decision block 711, described later. If the data is textual, processing continues at block 705.

At block 705, the textual data is evaluated to identify indicia of visual structure, such as tab characters. Other indicia of visual structure may also be present that is considered, such as space characters or the like. Once the indicia of visual structure (e.g., tab characters) has been identified, processing continues at block 707.

At block 707, each portion of the data with unique indicia of visual structure is assigned an appropriate location in outline structure. For instance, paragraphs without a leading tab character may be assigned to level 1. Paragraphs with one leading tab character may be assigned to level 2, and so on. Other rules for handling tab characters may also be employed, and similarly, other rules for handling non tab-character visual indicia may also be employed.

At block 709, any parent/child relationships that can be discerned from the visual structure are created in the outline structure. For example, successive paragraphs that have been assigned decreasing levels may be identified as children of the paragraph at the highest level. Moreover, each paragraph may be identified as a child of its immediately preceding paragraph at a higher level. Returning to decision block 703, if the received data is not textual data, the process continues at decision block 711.

At decision block 711, a determination is made whether the received data is markup. If so, the process continues at block 713. If not, the process continues at block 719 where some appropriate alternative processing is performed.

At block 713, the markup is evaluated to identify properties of tags that affect the visual structure of the data. As discussed above, examples of the indicia may include margin or indentation attributes of tags that set the position of a particular passage of data relative to the document edge. Once these properties are identified, the process continues at block 715.

At block 715, an aggregate value is determined for the properties affecting the visual structure of the data. In one example, the values for any indentation attributes, margin attributes, and the like may be summed to achieve a total indentation for the contents of each tag. At this point, the aggregate value for each tag describes the relative positions of each tag, and hence the visual structure of the data. The process then continues at block 717.

At block 717, the outline structure is created by assigning levels to each element of the markup based on the aggregate value of indentation. As with the textual case describe above, different levels may be associated with a particular amount of indentation, and assigned to the data accordingly. For instance, a new level may be associated with each element at roughly 0.5 inch increments.

If the process arrives at block 719, then the received data is neither textual or markup, and some processing may be performed as an alternative to that just described. For instance, other indicia of visual structure may exist in addition to those described in this document. It is envisioned that those indicia may be evaluated in some fashion and converted to outline structure in a manner consistent with the teachings presented here. Accordingly, at block 719, some other equivalent form of conversion may be performed on the data consistent with the type of visual structure present, if any. Alternatively, an error may be generated and reported to the user. These and other alternatives will be apparent to those skilled in the art.

Figure 8:
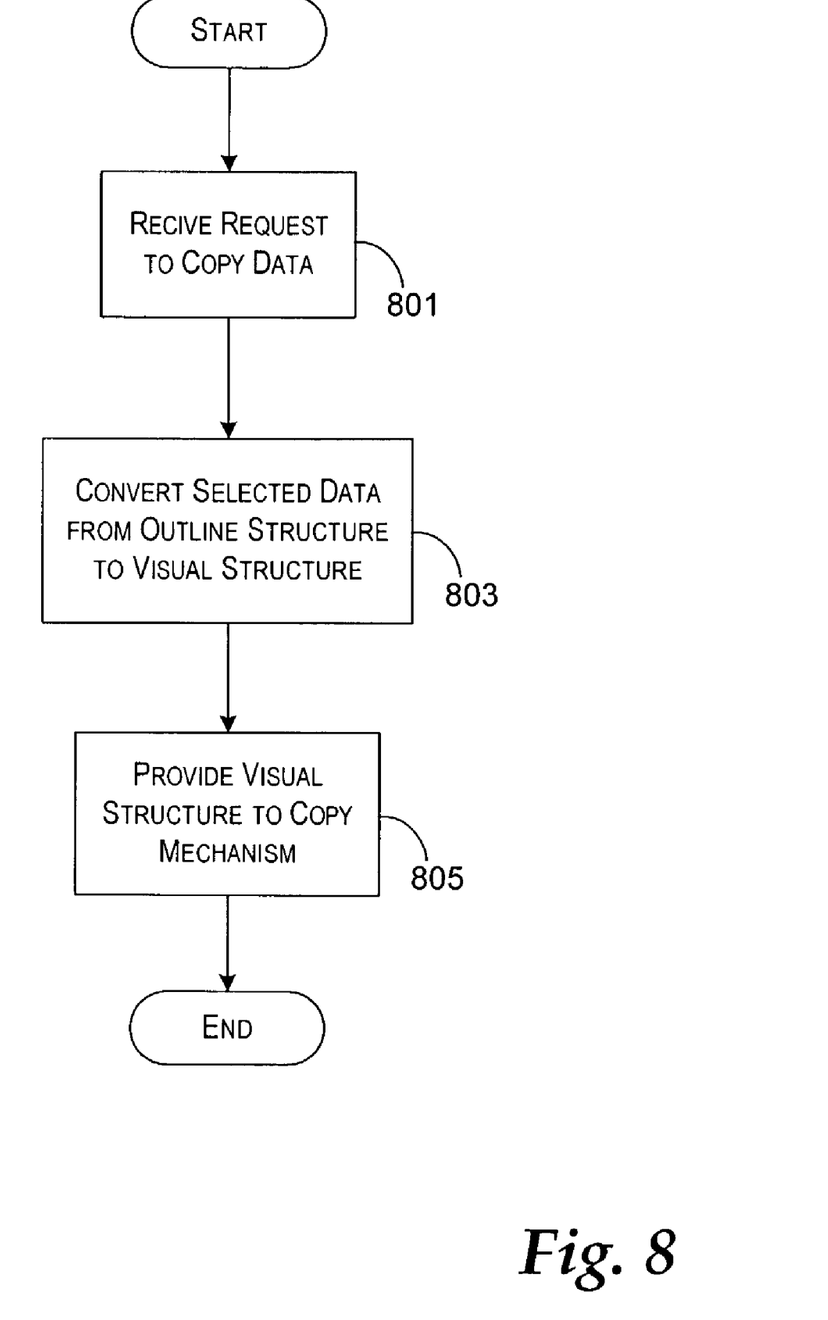
FIG. 8 is a logical flow diagram generally illustrating a process for converting data that includes outline structure to data with visual structure indicia for use in non-outlining applications.

FIG. 8 is a logical flow diagram generally illustrating a process for converting data that includes outline structure to data with visual structure indicia for use in non-outlining applications. The process begins at block 801, where a request has been received to copy selected data from within an outlining application. In accordance with the invention, the selected data includes outline structure through which levels have been assigned to various portions of the data, and parent/child relationships may also have been created. Once the request to copy the selected data has been identified, the process continues at block 803.

At block 803, the selected data is converted from the outline structure to visual structure. In one implementation, this step is achieved by analyzing the outline structure and inserting tab characters or the like to produce visual distinctions between data at each level in the outline structure. Alternatively, margin or indentation attributes may be set on tags associated with each element in the outline structure to create a marked-up version of the selected data that will have visual structure. Other alternatives will also become apparent.

At block 805, the converted data is provided to a copy mechanism in visual structure format. For example, if the selected data has been converted to textual data with visual structure, the selected data may be presented to a clipboard component as text data with tab characters or the like. It will be appreciated that the actual implementation of presenting selected data to a copy mechanism may vary significantly from system to system, but that the concept is consistent. For instance, in one implementation, the act of presenting the selected data may include identifying to a clipboard component that data has been selected and identifying various possible formats for providing that selected data to the clipboard component. Then when a paste command is received, the selected data is provided in whatever format has been identified by the clipboard component.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for converting data from a non-outline format to an outline format, the method comprising:

accessing a document that is created using a non-outlining application; wherein the document created using the non-outlining application includes lines of text that include indicia of visual structure but are devoid of data that explicitly defines an outline structure that includes level information that defines hierarchical interrelationships between the elements; wherein the indicia of visual structure visually positions the lines of text of the document when displayed on a display; wherein the indicia of visual structure presents the appearance of outline structure; and wherein the indicia of visual structure associated with each lines of text is defined independently from the indicia of visual structure of associated with other lines of text;

copying the lines of text of the document to a clipboard using the non-outlining application;

pasting the lines of text of the document within the clipboard into an outlining application; wherein the outlining application is configured to:

automatically transform the pasted lines of text that are devoid of data that explicitly defines an outline structure into an outline structure by evaluating the visual structure and associating a level with each of the lines of text; wherein the outline structure includes a plurality of levels and wherein each line of the text is associated with only one of the levels after the transformation to the outline structure such that the appearance of the outline structure that the text is transformed is responsive the appearance of outline structure presented by the indicia of visual structure.

2. The computer-implemented method of claim 1, wherein automatically transforming the pasted lines of text of the document to the outline structure comprises determining a spacing that is associated with each of the lines of text.

3. The computer-implemented method of claim 2, further comprising determining how many different spacings are associated with each of the lines of text and for each of the different spacings assigning a different level.

4. The computer-implemented method of claim 3, further comprising assigning a higher level to the lines of text that have a smaller spacing from a beginning of the line of text as compared to a line of text having a larger spacing at the beginning of the line of text.

5. The computer-implemented method of claim 1, wherein the indicia of visual structure comprises characters associated with formatting text.

6. The computer-implemented method of claim 5, wherein the indicia of visual structure comprise tab characters.

7. The computer-implemented method of claim 6, wherein transforming the lines of text comprises determining a number of tab characters for each line of text and, the value of the level for the line of text being determined based on the number of tab characters.

8. The computer-implemented method of claim 7, wherein each of the lines of text that have the same number of tab characters before the text of the line starts is assigned the same level.

9. The computer-implemented method of claim 1, wherein the indicia of visual structure comprises attributes of elements of the data.

10. The computer-implemented method of claim 9, wherein the attributes comprise properties of tags affecting a position of the elements in relation to the document.

11. The computer-implemented method of claim 10, wherein the properties comprise a one or more of a margin property, an indentation property, and a tab count property.

12. A computer-readable storage medium having computer executable instructions for converting data from a first format to a second format, the instructions comprising:
in response to a notification to paste selected data into a document maintained by an outline aware application executing on a processor, the selected data including lines of text that include indicia of visual structure but are devoid of outline structure that includes level information that defines hierarchical interrelationships between elements; wherein the indicia of visual structure presents the appearance of outline structure; and wherein the indicia of visual structure associated with each lines of text is defined independently from the indicia of visual structure of associated with other lines of text:
evaluating each of the lines of text within the selected data to identify the indicia of visual structure, wherein the indicia of visual structure indicates an amount of spacing before each of the lines of text such that the visual indicia of an outline is presented when the lines of text are displayed; and
automatically assigning a level to each of the lines of text based on the indicia corresponding to that line of text to generate data that expressly defines the outline relationship between each lines of text in response to the visual indicia of an outline; wherein each line of text is assigned a single level such that the appearance of the outline structure of the text is transformed is responsive the appearance of outline structure presented by the indicia of visual structure.

13. The computer-readable storage medium of claim 12, wherein the indicia of visual structure comprises tab characters.

14. The computer-readable storage medium of claim 13, wherein assigning the level to each of the lines of text comprises determining a number of tab characters associated with each of the lines of text, and assigning the level based on the number of tab characters.

15. The computer-readable storage medium of claim 12, wherein the data comprise tagged portions of marked up data, and the indicia of visual structure comprises attributes of each tagged portion.

16. The computer-readable storage medium of claim 15, wherein assigning the level to each of the lines of text comprises determining an aggregate amount by which a line of text is indented in relation to a document including the data, and assigning the level based on the aggregate amount.

17. The computer-readable storage medium of claim 12, further comprising assigning parent/child relationships to the lines of text based on relative levels for each portion.

18. The computer-readable storage medium of claim 17, wherein the parent/child relationships are created by identifying when a line of text is indented more than another line of text.

19. A computer-readable storage medium having computer-executable instructions for converting data from a first format to a second format, the instructions comprising:
receiving a notification that data within an outline document has been selected for sharing with another application, the selected data including outline structure that explicitly associates a relative level with each line of text; and
using a processor, automatically converting the outline structure to visual structure by inserting indicia of visual structure at each level of the selected data and removing all of the outline structure that explicitly indicates the level information from the selected data; wherein the indicia of visual structure is a spacing associated with the data that is before the beginning of each line of text within the data such that a visual indicia of an outline is presented when the lines of text are displayed; wherein the amount of space associated with each line of text is determined in response to the data structure that explicitly associated a relative level with each line of text; wherein the indicia of visual structure is devoid of outline structure that includes level information that defines hierarchical interrelationships between elements; wherein the indicia of visual structure presents the appearance of outline structure; and wherein the indicia of visual structure associated with each lines of text is defined independently from the indicia of visual structure of associated with other lines of text.

20. The computer-readable storage medium of claim 19, wherein the indicia of visual structure comprises tab characters.

21. The computer-readable storage medium of claim 20, wherein converting the outline structure comprises inserting a number of tab characters into portions of the selected data based the level of the portion of selected data.

22. The computer-readable storage medium of claim 19, wherein the indicia of visual structure comprises markup tag attributes.

23. The computer-readable storage medium of claim 22, wherein the markup tag attributes include properties that define a position of content of the markup tag in relation to an edge of a document including the selected data.

* * * * *